United States Patent
Monaghan et al.

(10) Patent No.: US 9,483,420 B2
(45) Date of Patent: Nov. 1, 2016

(54) SELF-SERVICE TERMINAL (SST) DEVICE DRIVER

(71) Applicant: NCR Corporation, Duluth, GA (US)

(72) Inventors: Andrew Monaghan, Dundee (GB); Richard Han, Angus (GB)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 14/193,668

(22) Filed: Feb. 28, 2014

(65) Prior Publication Data
US 2015/0248359 A1 Sep. 3, 2015

(51) Int. Cl.
G06F 9/54 (2006.01)
G06F 13/10 (2006.01)

(52) U.S. Cl.
CPC ............ G06F 13/102 (2013.01); G06F 9/54 (2013.01); G06F 9/541 (2013.01)

(58) Field of Classification Search
CPC ... G06Q 20/1085; G06F 13/102; G06F 9/54; G06F 9/541; G07F 19/20
See application file for complete search history.

(56) References Cited

U.S. PATENT DOCUMENTS

| | | | |
|---|---|---|---|
| 5,901,312 A | 5/1999 | Radko | |
| 7,469,350 B2 * | 12/2008 | Henderson et al. | 713/300 |
| 8,201,732 B1 | 6/2012 | Kropf et al. | |
| 2003/0014521 A1 | 1/2003 | Elson et al. | |
| 2005/0210479 A1 | 9/2005 | Andjelic | |
| 2006/0242611 A1 * | 10/2006 | Drake | 716/1 |
| 2011/0296092 A1 * | 12/2011 | Cornwell et al. | 711/103 |
| 2012/0131375 A1 * | 5/2012 | Adda | G06F 11/0793 714/2 |
| 2012/0160913 A1 * | 6/2012 | Shepley et al. | 235/379 |
| 2012/0297094 A1 * | 11/2012 | Chisholm | 710/10 |
| 2015/0212832 A1 * | 7/2015 | Zhou | G06F 9/4411 719/327 |

OTHER PUBLICATIONS

European Search Report issued in corresponding European Patent Application EP 15153244.7 dated Apr. 26, 2016.

* cited by examiner

Primary Examiner — Charles E Anya
(74) Attorney, Agent, or Firm — Schwegman, Lundberg & Woessner

(57) ABSTRACT

Methods for extensible device drivers and an extensible device driver Self-Service Terminal (SST) are provided. A SST includes an operating system (OS) having a communication port and an application having low-level commands that are specific to a hardware device, which is coupled to the SST; the low-level commands directly capable of being executed by the device. The communication port is operable to relay information and commands (including the low-level commands) between the device and the application. The application directly controls the device, with the low-level commands, and the low-level commands unrecognized by the OS.

12 Claims, 4 Drawing Sheets

SELF-SERVICE TERMINAL (SST) DEVICE DRIVER

BACKGROUND

Traditionally, hardware drivers are packaged as separate binary components that extend the Operating System (OS), the hardware drivers also provide Application Programming Interfaces (APIs) to applications for controlling devices associated with the drivers. This separation between the OS components and the application components (API) adds complexity to updates requiring either:

the OS to be enhanced with a driver packaged into the OS and thereby forcing an OS update when a driver needs to be changed; or the driver needs to be deployed as a separate deployment unit installed as a separate package after the OS, this separate package requires special OS permissions to be deployed and, therefore, introducing the potential for security vulnerabilities and attacks.

The issues, associated with hardware device installation, are particularly noticeable with Self-Service Terminals (SSTs), such as Automated Teller Machines (ATMs). An ATM is a highly secure type of SST, where administrative access to the underlying OS, hardware devices, and software is restricted to select engineers. Remote network access is generally forbidden, even to the servicing engineers. As a result, when a new hardware device is swapped out of the ATM (for a defective device or when a new device with newer features is installed on the ATM) the bank staff has to wait for an available engineer and the update process can take some time. Moreover, the OS itself may not even permit the newer device or may require an update to the OS, which can also add significant time and complexity to the installation and testing of a new device on the ATM platform.

SUMMARY

In various embodiments, an extensible Self-Service Terminal (SST) device driver and techniques for installing and using the SST device driver are presented.

According to an embodiment, a SST is provided that includes an Operating System (OS) and an application. The (OS) includes a communication port and the application includes low-level commands specific to a hardware device, which is coupled to the SST through the communication port, and the low-level commands directly executable by the hardware device. The communication port operable to relay information and commands between the hardware device and the application, and the application directly controls the hardware device; the low-level commands unrecognized by the OS.

DETAILED DESCRIPTION

Figure 1:
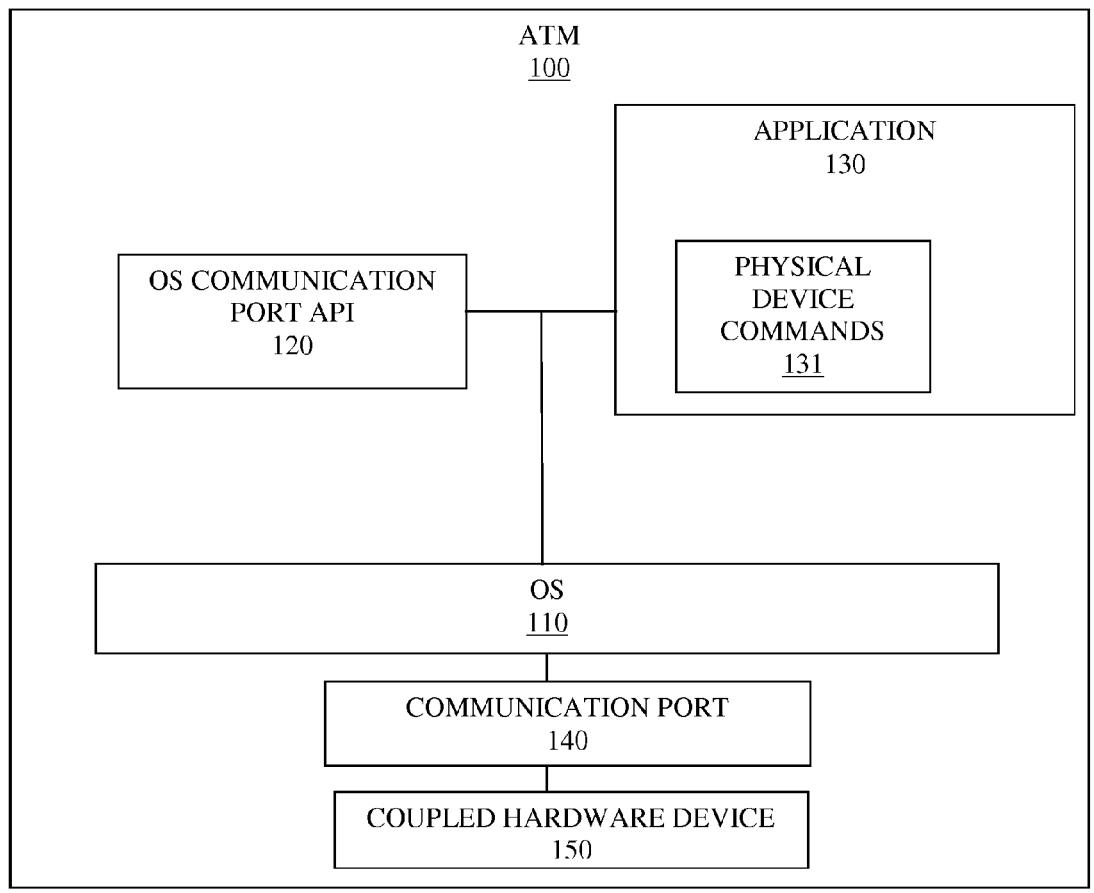
FIG. 1 is a diagram of an Automated Teller Machine (ATM) having application-level device driver support, according to an example embodiment.

FIG. 1 is a diagram of an Automated Teller Machine (ATM) 100 having application-level device driver support, according to an example embodiment. The various components are illustrated and the arrangement of the components is presented for purposes of illustration only. It is to be noted that other arrangements with more or less components are possible without departing from the application-level device driver support presented herein and below.

The ATM 100, methods, and SST presented herein and below for extensible SST device driver operation can be implemented in whole or in part in one, all, or some combination of the components shown with the ATM 100. The techniques and methods are programmed as executable instructions in memory and/or non-transitory computer-readable storage media and processed on one or more processors associated with the various components. Moreover, the ATM 100 is shown in greatly simplified form, illustrating primarily (but not exclusively), just the components that are enhanced or that are necessary for comprehending the teachings presented herein.

The discussion that follows represents one embodiment of the invention for an application 130 within an ATM 100. It is noted that any SST, such as a kiosk, or any device can benefit from the teachings presented herein; some of which are discussed with reference to the FIGS. 2-4. Thus, the description that follows below is but one embodiment of the invention and it not intended to limit the invention to only financial transactions at financial facilities.

The ATM 100 includes an operating system (OS) 110, an OS communication port API 120, an application 130 having physical device commands 131, a communication port 140, and a coupled hardware device 150.

The OS 110 provides a processing environment (platform) for executing commands, operations, and applications and for accessing devices and peripherals coupled or interfaced to the OS 110.

In an embodiment, the OS 110 is an Android® OS.

In an embodiment the OS is selected from one of: Tizen, Unix®, or Linux® based open-source OS, and other open source OSs.

In an embodiment, the OS 110 is selected from one of: Windows®, Apple iOS®, Blackberry®, and other non-open source or proprietary OSs 110.

The OS communication port API 120 is an interface provided by the OS 110 to applications, such as application 130, for access to a communication port 140 of the ATM 100. Primarily, this port API 120 allows an application to connect direct to the port 140 and pass commands from the application 130 to the hardware device 150 coupled to the ATM 100 though the port 140.

In an embodiment, the port 140 is a Universal Serial Bus (USB) port and the port API 120 is a USB API 120.

The application 130 is configured with the physical device commands 131 necessary to access and communicate with the coupled hardware device 150. The physical device commands 131 can be in any low-level format expected and recognized by the coupled hardware device 150, such as but not limited to binary instructions and memory or storage locations and offsets for activating commands and storage locations. In some cases, the physical device commands 131 can be at a higher-level, such that recognized API calls can be made. But, regardless of the level of abstraction associated with the physical device commands 131, the OS 110 lacks and does not recognize that format; the OS 110 just connects the application 130 to the port 140 and provides the port API 120 for the application 130 to communicated with the hardware device 150.

The OS 110 also terminates the connection between the application 130 and the port 140. This can occur when the application 130 specifically issues an OS-recognized command to terminate the connection (the command may also be part of the port API 120). This can also occur when the application 130 is terminated (normally or abnormally) from execution within the ATM 100 or can occur when the hardware device 150 is decoupled (removed) from port 140.

Additionally, the application 130 is the device driver for the hardware device 150. That is, the OS 110 lacks a device driver to service the hardware device 150. The device driver is referred to as a "soft driver" because access to device-specific (low-level) commands is controlled by a user-application, such as application 130, and not by the OS 110, which is typically the case. Thus, access to the hardware device 150 cannot be achieved outside the scope of execution for the application 130. This provides additional security to the ATM 100 (which is critical in ATM environments) because any access occurring originates from the application 130.

Typically, when a new device is installed on a device, the OS restricts access to that device until the OS can locate and install a device driver for interfacing with the device through a communication port to deliver device-specific commands and to receive device-specific responses.

However, as will be illustrated more completely herein and below, the OS 110 requires no device driver to install and permit communication with a newly coupled hardware device 150. Rather, the application 130 provides the device driver to the coupled hardware device 150 by requesting the OS 110 to connect the application 130 to the port 140 and by using the OS-provided port API 120 from which the application 130 can deliver physical device commands 131 to the hardware device 150 and receive responses from the hardware device 150.

The application 130 may also have an application interface providing user interaction capabilities and/or application API commands for other application-layer applications to interact with the application 130.

During operation of the application 130 within the ATM 100, the hardware device 150 is detected as being connected, coupled or interfaced to the ATM's communication port 140. This causes the OS 110 to receive notice of the connection over the port 140. The notice is communicated by the OS 110 to the application 130. This can occur via a notification command of the port API 120 or via other OS-provided commands configured in the application 130.

Once the application 130 receives the notice from the OS 110, the application 130 requests a connection to the port 140. This can occur via a command in the port API 120 or via a standard port connection command configured in the application 130 and recognized by the OS 110.

After the connection to the port 140, the application 130 uses commands selected from the port API 120 to issue the physical device commands 131 over the port 140 and directly to the hardware device 150. The hardware device 150 recognizes the commands 131 and takes the appropriate actions, and perhaps, delivers responses or other data back through the port 140, which may also be in a device-specific format. The application 130 being connected to the port 140 receives the responses or other data and processes that according to the application's configured logic.

In embodiment, each device command 131 is encrypted or includes a key that is only capable of decryption or validation between the hardware device 150 and the application 130. In this manner security can be further enhanced because the hardware device 150 is preconfigured to valid each command 131 and provided encrypted data back as a response. So, assuming the application 130 were replaced or modified by an unauthorized application within the OS 110 of the ATM 100 and that application somehow knew the device commands 131, communications between that application and the hardware device 150 would fail because the encrypted communications or validations would fail on the hardware device 150.

Security is of particular concern to ATMs, since financial transactions of consumers are occurring and since ATMs are equipped with large amounts of currency.

Maintenance, support, and management are also issues for staff that services the ATMs with respect to coupled hardware devices. The techniques of providing soft device driver support on an ATM 100 though an application 130 of the OS 110 improve maintenance, support, and management of the ATM 110 beyond what has heretofore been available in the industry.

For example, an update to the application 130 is also an update or provides an opportunity for updating the commands 131, which effectively updates device driver support for the hardware device 150. It is noted this occurs without requiring any update to the OS 110.

Furthermore, since the device commands 131 are controlled by the application 130 (perhaps via a file reference and indexing mechanism), the device commands 131 can be updated (soft driver update) by replacing a file accessible to the application 130. This provides great flexibility with respect to managing the application and the device driver for the hardware device 150 because the commands 131 are not hardcoded in the application 130 and replacing a file having the commands 131 effectively updates the device driver, without updating the application 130 and without updates to the OS 110.

It is also noted that the application 130 can have different sets and types of device commands for device driver support of different devices coupled to the ATM 100. So, one application 130 can server as multiple soft device drivers for multiple hardware devices. Different port APIs can also be used for different communication ports accessible on the ATM 100 and as provided to applications.

Moreover, it is to be noted that although ATM 100 depicts a single application 130 there can actually be multiple independent applications (for application 130), each having its own physical device commands 131 (some may be directed to the same hardware device 150 or directed to a different coupled hardware device). As stated before, the ATM 100 is provided in greatly simplified form and the single application 130 and single hardware device 150 are presented for purposes of illustration only and such depiction is not intended to limit the scope of ATM 100 to just a configuration having single instances of the application 130 and the hardware device 150.

In an embodiment, the hardware device 150 is a dispenser that dispenses valuable media at the AMT 100, such as currency, rewards, virtual currency (via interfaced non-transitory computer-readable media devices), coupons, and the like.

In an embodiment, the hardware device 150 is an encrypted Personal Identification Number (PIN) pad device.

In an embodiment, the hardware device 150 is a monitor device.

In an embodiment, the hardware device 150 is a printer, such as for printing receipts.

In an embodiment, the hardware device 150 is a user input device, such as a keypad.

In an embodiment, the communication port 140 is a USB port.

In an embodiment, the communication port 140 is a Secure Digital (SD) card slot.

In an embodiment, the communication port 140 is an Ethernet port.

In an embodiment, the communication port 140 is selected from one of: a Video Graphics Array (VGA) port, a High-Definition Multimedia Interface (HDMI), and an Apple Thunderbolt™ port.

One now appreciates how device driver support for coupled hardware device 150 of an ATM 100 can be achieved via an application 130 within an application layer 120 of an OS 110. This improves security and removes the dependency of device drivers from the OS 110 when the OS 110 is updated or when the device driver is updated. This also improves maintenance, support, and management of the hardware device 150 more efficiently than what has heretofore been available in the industry.

These (above-discussed) embodiments and other embodiments are now discussed with reference to the FIGS. 2-4.

Figure 2:
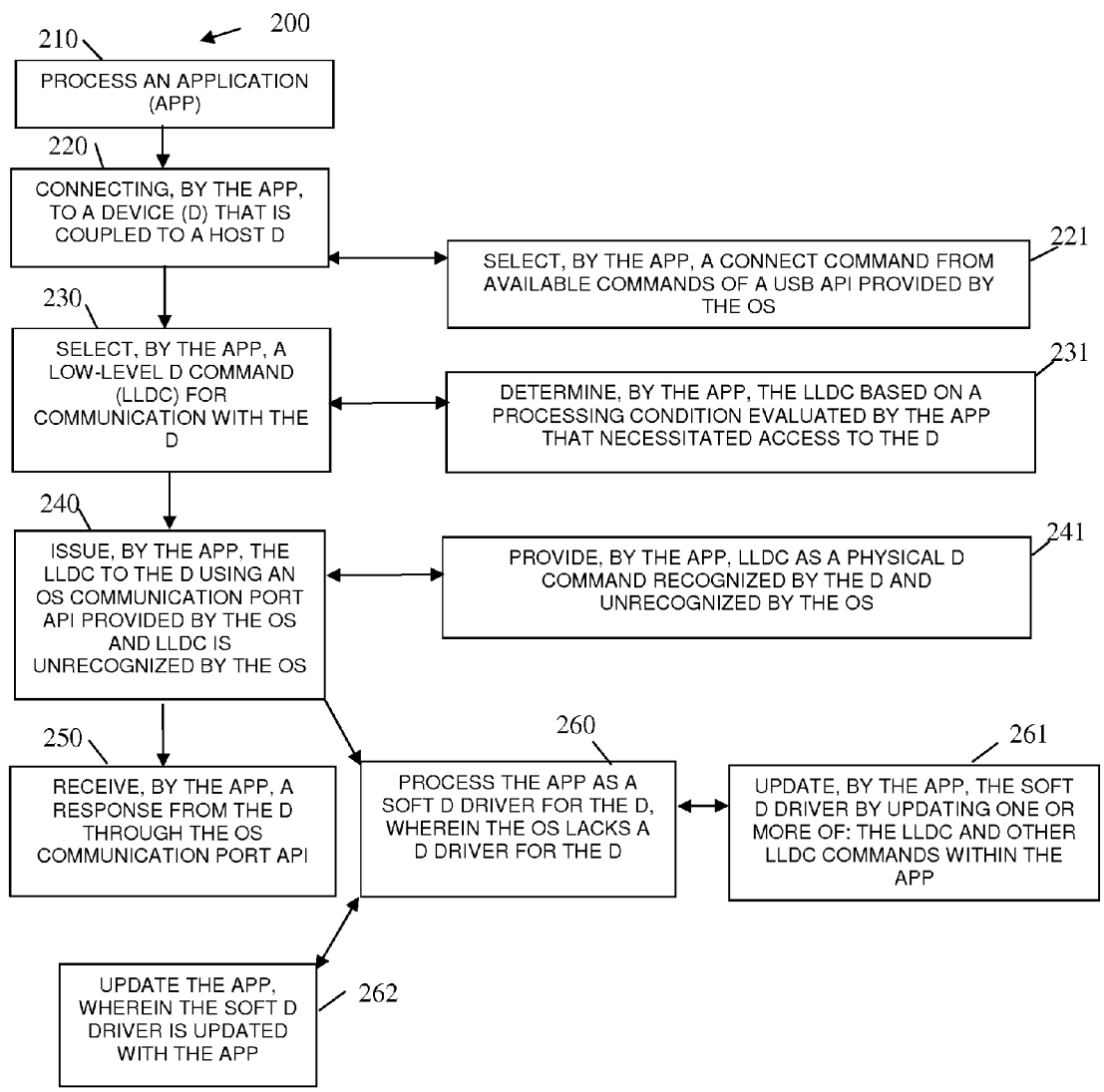
FIG. 2 is a diagram of a method for interacting with an extensible SST device driver, according to an example embodiment.

FIG. 2 is a diagram of a method 200 for interacting with an extensible SST device driver, according to an example embodiment. The software module(s) that implements the method 200 is referred to as a "soft device driver." The soft device driver is implemented as executable instructions programmed and residing within memory and/or a non-transitory computer-readable (processor-readable) storage medium and executed by one or more processors of a host device. The processor(s) of the host device that executes the soft device driver is specifically configured and programmed to process the soft device driver. The soft device driver has access to one or more networks during its processing. The networks can be wired, wireless, or a combination of wired and wireless.

So, initially at 210, a processor(s) of the host device executes the soft device driver (referred to as "application" in the FIG. 2) on that host device within an OS that provides the processing environment or platform for the soft device driver.

In an embodiment, the host device that processes the soft device driver is the ATM 100.

In an embodiment, the host device that processes the soft device driver is a kiosk.

At 220, the soft device driver connects to a hardware device that is coupled to the host device. This may be after the OS notifies the soft device driver that the hardware device is present or connected to a communication port of the host device.

According to an embodiment, at 221, the soft device driver selects a connect command from available commands provided by the OS in a USB port API for communication by the application with the communication port that the hardware device is coupled to.

At 230, the soft device driver a low-level command (device-specific command) for communication with the hardware device. That is, the soft device driver selects a particular command from the commands recognized by the hardware device (physical device commands or device commands recognized by the hardware device).

In an embodiment, at 231, the soft device driver determines the low-level device command based on a processing condition evaluated by the soft device driver that necessitated a communication or access between the soft device driver and the hardware device. This can be any logic evaluated in the soft device driver.

At 240, the soft device driver issues the low-level device command to the hardware device (coupled to the host device) using an OS communication port API provided by the OS. The OS does not recognize the low-level device command.

According to an embodiment, at 241, the soft device driver provides the low-level device command as a physical device command that is specific and proprietary to the hardware device. Again, this physical device command is unrecognized by the OS. This means the OS does not know how to handle or recognize the format of the physical device command.

In an embodiment, at 250, the soft device driver receives from the hardware device a response to the initially issued low-level device command. The response is received through the OS communication port API.

In an embodiment, at 260, the software is processed by the processor (of the host device, and the processing associated with 210-250) as a soft device driver for the hardware device. In other words, the soft device driver is a device driver for the hardware device and the OS lacks a device driver for independently interacting with the hardware device. The soft device driver is the device driver for the hardware device.

According to an embodiment of 260 and at 261, the soft device driver updates the soft device driver by updating the low-level device command and/or updating other low-level device commands within the soft device driver. This can be done when the low-level device commands are available within files accessible to the soft device driver, such that the soft device driver selects a new file or selects a file that was modified to effectively update the soft device driver.

In another case, at 262, the processor of the host device that executes the soft device driver updates the soft driver by updating the soft device driver.

Figure 3:
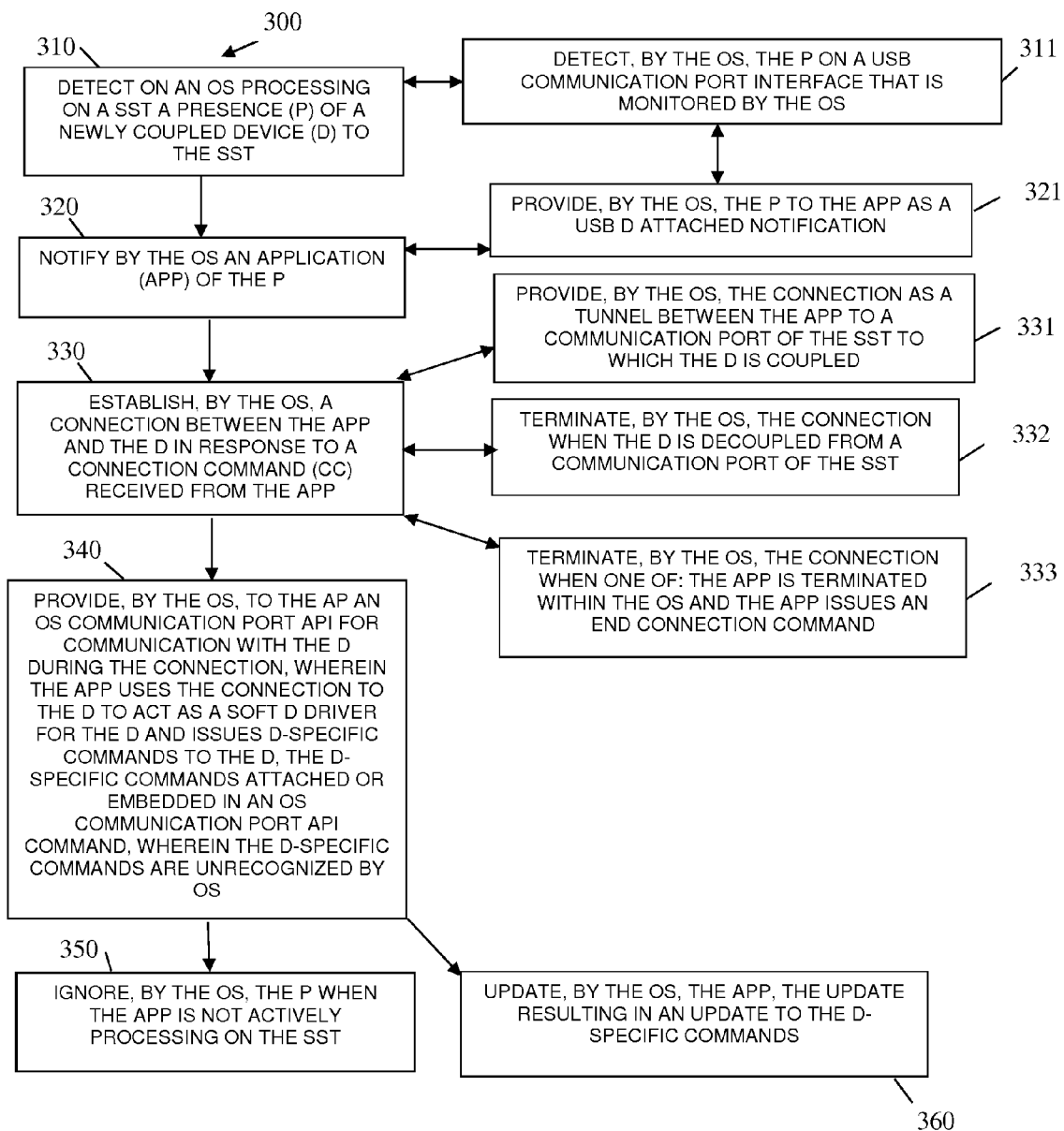
FIG. 3 is a diagram of another method for interacting with an extensible SST device driver, according to an example embodiment.

FIG. 3 is a diagram of another method 300 for interacting with an extensible SST device driver, according to an example embodiment. The software module(s) that implement the method 300 is referred to herein as an SST soft driver OS. The SST soft driver OS is implemented as executable instructions and programmed within memory and/or a non-transitory computer-readable (processor-readable) storage medium that executes on one or more processors of an SST. The processors of the SST are specifically configured to execute the SST soft driver OS. The SST soft driver OS can access one or more networks; the networks can be wired, wireless, or a combination of wired and wireless.

In an embodiment, the SST that processes SST soft driver OS is the ATMs 100.

In an embodiment, the SST that processes the SST soft driver OS is a kiosk.

In an embodiment, SST soft driver OS is implemented as an enhancement to an OS of an SST.

At 310, the SST soft driver OS detects a presence of a newly coupled device to the SST. This is achieved through a communication port interface for a communication port that the SST soft driver OS is managing for the SST.

According to an embodiment, at 311, the SST soft driver OS detects the presence on a USB communication port interface that is monitored by the SST soft driver OS.

At 320, the SST device driver manager notifies an application of the presence detected on the communication port interface of the SST.

In an embodiment, the application is application 130.

In an embodiment, the application is the method 200 of the FIG. 2.

The notification can occur via a communication port interface API provided to the application by the SST soft driver OS; alternatively, the notification can occur via standard device notification messages of the OS to the application.

According to an embodiment of 320 and 311 and at 321, the SST soft driver OS provides the notification as a USB attached device notification, recognized by the processing logic of the application as the coupled device to the SST via the communication port.

At 330, the SST soft driver OS establishes a connection between the application and the coupled device. This is done in response to a connection request issued by the application to the SST soft driver OS. Again, the connection request can be issued by the application using a communication port interface API provided by the OS to the application or the application issues an SST soft driver OS command recognized by the SST soft driver OS (which is not included in the communication port API—standard device connection request).

According to an embodiment, at 331, the SST soft driver OS provides the connection between the application and the coupled device as a tunnel between the application and the communication port of the SST to which the coupled device is attached.

In an embodiment, at 332, the SST soft driver OS terminates the connection when coupled device is decoupled from the communication port of the SST. For example, someone has physically removed the coupled device from the communication port (e.g., disconnected a USB device from a USB port).

In an embodiment, at 333, the SST soft driver OS terminates the connection when the SST soft driver OS receives a connection termination command from the application or when the application ceases to execute on the SST (such as when the application terminates normally or abnormally).

At 340, the SST soft driver OS provides an OS communication port API to the application for the application to communicate with the communication port of the SST that the coupled device is attached to. The application uses the connection and the communication port API to communicate with the coupled device directly. The application issues device-specific commands during the connection that are recognized and processed by the coupled device. The connection, OS communication port API, and the application (having the device-specific commands) permit the application to act as a soft device driver for the coupled device. The device-specific commands are unrecognized by the SST soft driver OS and the SST soft driver OS lacks a device driver for the coupled device. So, the application is the device driver for communication with the coupled device.

According to an embodiment, at 350, the SST soft driver OS ignores the presence of the coupled device attached to the communication port of the SST when the application is not actively executing on the SST.

In an embodiment, at 360, the SST soft driver OS updates the application and the update results in an update to the device-specific commands. Essentially, an update to the application is an update to the device driver because the application is a soft device driver for the coupled device (via the device-specific commands).

Figure 4:
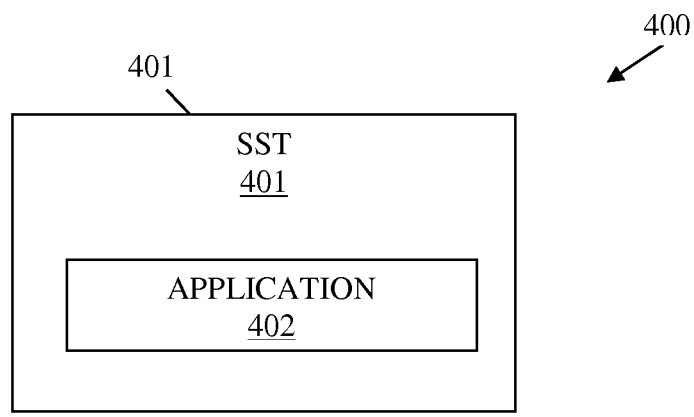
FIG. 4 is a diagram of an extensible device driver SST, according to an example embodiment.

FIG. 4 is a diagram 400 of an extensible device driver SST 401, according to an example embodiment. The components of the extensible device driver SST 401 (hereinafter just "SST 401") are programmed and reside within memory and/or a non-transitory computer-readable medium and execute on one or more processors of the SST 401. The SST 401 has access to and can communicate over one or more networks; and the networks can be wired, wireless, or a combination of wired and wireless.

The SST 401 includes an application 402 (software module or set of modules) that execute as executable instructions on one or more processes of the SST 401. The executable instructions reside in memory and/or a non-transitory computer-readable storage medium accessible to the SST 401.

In an embodiment, the SST is the ATM 100.

In an embodiment, the SST is a kiosk.

The SST 401 is programmed with the application 402. The application 402 is operable to execute on the SST.

The application 402 operable to execute within an OS on the SST 401 and connect to a communication port of the SST to which a hardware device is coupled. The extensible SST 401 is also operable to issue device-specific commands to the hardware device during the connection through a communication port API provided by the OS to direct the device-specific commands from the application to the communication port. The device-specific commands are unrecognized by and inaccessible to the OS and the device-specific commands are recognized by and processed on the hardware device.

According to an embodiment, the application 402 is further operable to process as a soft device driver for the hardware device though the device-specific commands and process as an interface to managing, controlling, and accessing the hardware device through a user API accessible from the user-application layer of the OS.

According to an embodiment, the application 402 is the application 130.

In an embodiment, the application 402 is the method 200 of the FIG. 2.

In an embodiment, the OS is an enhanced OS or enhanced feature to an OS represented by the method 200 of the FIG. 2.

In an embodiment, the hardware device is inaccessible outside an execution space associated with the application 402 within the OS.

According to an embodiment, the SST 401 is an ATM and the hardware device is media dispenser coupled to the ATM via a USB communication port.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting, on an operating system (OS) processing on a Self-Service Terminal (SST), a presence of a newly coupled device to the SST;
   notifying, by the OS, an application of the presence;
   establishing, by the OS, a connection between the application and the device in response to a connection command received from the application;
   providing, by the OS, to the application an OS communication port Application Programming Interface (API) for communication with the device during the connection, wherein the application uses the connection to the device to act as a soft device driver for the device and issues device-specific commands to the device, the device-specific commands attached or embedded in an OS communication port API command, wherein the application bypasses the OS in issuing the device-specific commands to the device and the device-specific commands are unrecognized by OS; and ignoring, by the OS, the presence when the application is not actively processing on the SST.

2. The method of claim 1 further comprising, updating, by the OS, the application, the update resulting in an update to the device-specific commands.

3. The method of claim 1, wherein detecting further includes detecting, by the OS, the presence on a Universal Serial Bus (USB) communication port interface that is monitored by the OS.

4. The method of claim 3, wherein notifying further includes providing, by the OS, the presence to the application as a USB device attached notification.

5. The method of claim 1, wherein establishing further includes providing, by the OS, the connection as a tunnel between the application and a communication port of the SST to which the device is coupled.

6. The method of claim 1, wherein establishing further includes terminating, by the OS, the connection when the device is decoupled from a communication port of the SST.

7. The method of claim 1, wherein establishing further includes terminating, by the OS, the connection when one of: the application is terminated within the OS and the application issues an end connection command.

8. A Self-Service Terminal (SST), comprising:
   a processor configured with an application operable to: (i) execute within an operating system (OS) on the SST, (ii) connect to a communication port of the SST to which a hardware device is coupled, (iii) issue device-specific commands to the hardware device during the connection through a communication port Application Programming Interface provided by the OS to direct the device-specific commands from the application to the communication port, wherein the application bypasses the OS in issuing the device-specific commands to the communication port, the device-specific commands are unrecognized by the OS and the device-specific commands are recognized by and processed on the hardware device, and wherein the OS ignores issuing the commands when the application is not actively processing on the SST.

9. The SST of claim 8, wherein the application is further operable to (iv) process as a soft device driver for the hardware device though the device-specific commands and (v) process as an interface to managing, controlling, and accessing the hardware device through a user Application Programming Interface (API) accessible from the user-application layer of the OS.

10. The SST of claim 8, wherein the hardware device is inaccessible outside an execution space associated with the application within the OS.

11. The SST of claim 8, wherein the SST is an Automated Teller Machine (ATM) and the hardware device is media dispenser coupled to the ATM via a Universal Serial Bus (USB) communication port.

12. A method, comprising:
   detecting, on an operating system (OS) processing on a Self-Service Terminal (SST), a presence of a newly coupled device to the SST;
   notifying, by the OS, an application of the presence;
   establishing, by the OS, a connection between the application and the device in response to a connection command received from the application;
   providing, by the OS, to the application an OS communication port Application Programming Interface (API) for communication with the device during the connection, wherein the application uses the connection to the device to act as a soft device driver for the device and issues device-specific commands to the device, the device-specific commands attached or embedded in an OS communication port API command, wherein the device-specific commands are unrecognized by OS; and
   ignoring, by the OS, the presence when the application is not actively processing on the SST.

* * * * *